Jan. 22, 1924.

J. NELSON

CIGAR LIGHTER

Filed Nov. 11, 1922

1,481,383

WITNESSES

INVENTOR
John Nelson,
BY
ATTORNEYS

Patented Jan. 22, 1924.

1,481,383

UNITED STATES PATENT OFFICE.

JOHN NELSON, OF WINTER PARK, FLORIDA.

CIGAR LIGHTER.

Application filed November 11, 1922. Serial No. 600,456.

*To all whom it may concern:*

Be it known that I, JOHN NELSON, a citizen of the United States, and a resident of Winter Park, in the county of Orange and State of Florida, have invented certain new and useful Improvements in Cigar Lighters, of which the following is a specification.

This invention relates to cigar lighters and has for its object the provision of an ornamental lighter which is adapted for attachment to some part of an automobile or other vehicle where convenient to the driver or operator or a car whereby he may light a cigar or cigarette without the necessity of stopping the vehicle.

A further object of the invention is to provide a cigar lighter which is operated by means of an electric current and which is of such a design that it will not detract from or disfigure the part of the automobile to which it is applied.

Other objects and advantages will become apparent during the course of the following description.

Figure 1:
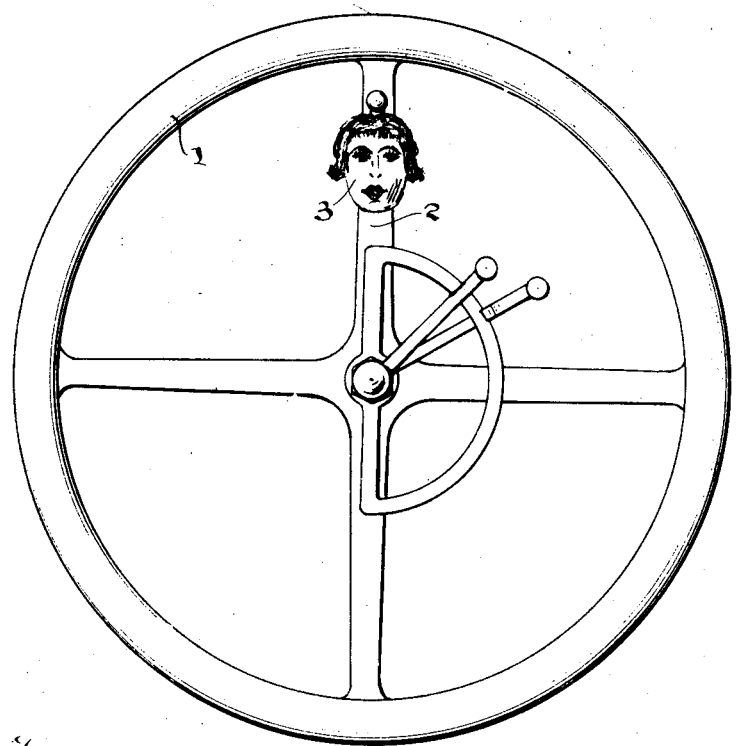

The invention is illustrated by way of example in the accompanying drawings, in which, Figure 1 is a plan view of a steering wheel showing my cigar lighter applied thereto.

Figure 2:
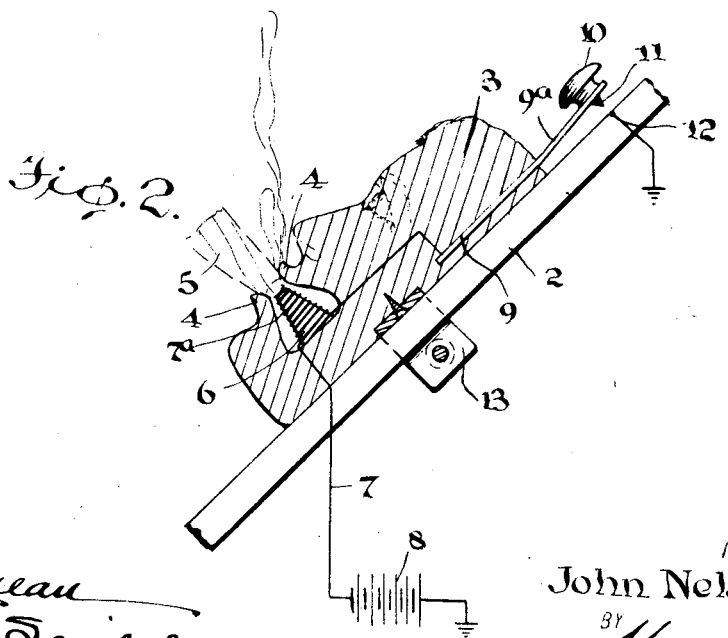

Figure 2 is a sectional view of my lighter.

Referring to the drawings, 1 indicates a steering wheel of an automobile. To a bar 2 of the web of the steering wheel is clamped the body 3 of the cigar lighter. The cigar lighter is designed to represent the head of a girl with the lips 4 spaced apart whereby the end of the cigar shown in dotted lines, is adapted to be inserted between the lips. The head is formed of hard clay and provided with a conical projection 6 located in a cavity below the lips with the smaller end of the projection extended to a point below the lips.

An electric wire 7 having one end connected with the battery 8 is coiled around the conical projection 6 with the coils forming a heating element 7ª with the coils forming said element located closer together at the apex of the projection so that when the cigar 5 is placed between the lips 4 the end will engage the coils of lesser diameter at the apex of the projection. The wire is continued through the head 3 and connected with a spring contact member 9. The outer end of the member 9 projects beyond the head and is provided with a finger piece 10 and a contact point 11. A second contact point 12 which is grounded is adapted to be engaged by the contact 11 when the outer projecting end of the resilient lever 9ª is depressed. Current will flow through the wire and due to the resistance of the wire 7ª, which is coiled around the conical projection 6, will produce heat sufficiently to light the end of the cigar when placed against that portion of the wire which is located at the apex of the projection 6. A release of the finger piece 10 will break the circuit.

A U-shaped clamping member 13 (shown in section only in Figure 2) which is rigidly connected with the head 3 embraces the bar 2 for clamping the head to the steering wheel. The finger piece 10 at the end of the lever 9ª is insulated to prevent the driver of the car from receiving a shock. The heating element is adapted to be raised to incandescence by the action of the current of electricity passing through it whereby the end of the cigar pressed against the heating element will be ignited.

What I claim is:

A cigar lighter comprising a base member in the shape of a face having lips spaced apart sufficiently to receive the end of a cigar, a cavity in the member below the lips, a cone-shaped member mounted in the cavity with the apex of the cone adjacent the space between the lips, a heating element in the form of a resistance wire coiled about the cone connected with a source of electric current, the apex of the cone being located inwardly of and in protected relation with the lips, a resilient lever rigidly mounted in the base member and connected with the heating element, said lever provided at its outer end with a contact member and an insulated finger piece, said lever forming a conductor between the contact and the heating element, and a grounded contact adjacent to the contact on the lever and adapted to be engaged by said first mentioned contact when the lever is depressed for closing the circuit and causing incandescence of the heating element on the conical member.

JOHN NELSON.